US009874296B2

United States Patent
Howe et al.

(10) Patent No.: US 9,874,296 B2
(45) Date of Patent: Jan. 23, 2018

(54) SNAP-IN DUCT SUPPORT SADDLE (71) Applicant: THE BOEING COMPANY, Chicago, IL (US)

(72) Inventors: Jeremy D. Howe, Everett, WA (US); Kyle Miller, Marysville, WA (US); Ernest L. Gibson, IV, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/011,587

(22) Filed: Jan. 31, 2016

(65) Prior Publication Data
US 2017/0219129 A1 Aug. 3, 2017

(51) Int. Cl.
*F16L 3/14* (2006.01)
*F16L 3/137* (2006.01)

(52) U.S. Cl.
CPC ............... *F16L 3/14* (2013.01); *F16L 3/137* (2013.01)

(58) Field of Classification Search
USPC ...... 248/58, 61, 62, 63, 65, 68.1, 74.3, 74.2, 248/219.4, 230.1, 230.6, 230.7, 230.8
See application file for complete search history.

(56) References Cited

U.S. PATENT DOCUMENTS

| | | | | | |
|---|---|---|---|---|---|
| 3,923,277 | A | * | 12/1975 | Perrault | F16L 3/00 211/196 |
| 4,907,766 | A | * | 3/1990 | Rinderer | F16L 3/24 248/57 |
| 5,050,824 | A | * | 9/1991 | Hubbard | F16L 3/24 248/57 |
| 6,565,048 | B1 | * | 5/2003 | Meyer | F16L 3/02 248/58 |
| 6,994,300 | B2 | * | 2/2006 | Labeirie | B64C 1/406 248/65 |

* cited by examiner

*Primary Examiner* — Alfred J Wujciak
(74) *Attorney, Agent, or Firm* — Patterson + Sheridan, LLP

(57) ABSTRACT

Method and apparatus for securing a duct to a bracket or hanger using a duct saddle. The duct saddle includes a body that includes a first side and a second opposing side. The body includes a duct seating surface on the a first side. The duct saddle also includes a plurality of retention clips extending from the body. The retention clips include respective tabs extending over the second side of the body and spaced apart from the second side of the body. The tabs include respective retention surfaces facing the second side of the body. The duct saddle also includes retention bodies extending from the respective retention surfaces toward the second side of the body. The above-described duct saddles can be installed on brackets without the use of fasteners, such as bolts and nuts.

7 Claims, 6 Drawing Sheets

FIG. 5C

SNAP-IN DUCT SUPPORT SADDLE

BACKGROUND

Aspects described herein relate to duct support saddles, and more specifically, to duct support saddles that snap into place in a bracket.

SUMMARY

According to one aspect, a duct saddle includes a body that includes a first side and an opposing second side. The body includes a duct seating surface on the first side. The duct saddle also includes a plurality of retention clips extending from the body. The retention clips include respective tabs extending over the opposing second side of the body and spaced apart from the opposing second side of the body. The tabs include respective retention surfaces facing the opposing second side of the body and defining respective gaps therebetween, the gaps being sized to accommodate a portion of a bracket. The duct saddle also includes retention bodies extending from the respective retention surfaces toward the opposing second side of the body. The retention bodies are adapted to fit in fastener holes in a bracket.

According to one aspect, a structure includes a plurality of structural support members. The structure also includes a plurality of brackets extending from the structural support members, wherein a distal end of each bracket includes a plurality of holes. The structure also includes a plurality of duct saddles arranged on the respective brackets. Each duct saddle includes a body that includes a first side and an opposing second side, wherein the body includes a duct seating surface on the first side. Each duct saddle also includes a plurality of retention clips extending from the body. The retention clips include respective tabs extending over the opposing second side of the body and spaced apart from the opposing second side of the body. The tabs include respective retention surfaces facing the opposing second side of the body, and wherein the distal end of the respective bracket is arranged between the retention surfaces and the opposing second side of the body. Each duct saddle also includes retention bodies extending from the respective retention surfaces toward the opposing second side of the body. The retention bodies extend into respective ones of the plurality of holes in the distal end of the respective bracket. The structure also includes a duct arranged extending along the plurality of duct saddles, wherein the duct is arranged in the duct seating surfaces of the respective duct saddles. The structure also includes a plurality retention straps arranged around respective ones of the plurality of duct saddles and the duct.

According to one aspect, a method for installing a duct in a structure includes securing a duct saddle on a bracket attached to a structural support member. The bracket includes a distal end with at least two holes through the bracket at the distal end. The duct saddle includes a body that includes a first side and an opposing second side. The body includes a duct seating surface on the first side and a plurality of retention clips extending from the body. The retention clips include respective tabs extending over the opposing second side of the body and spaced apart from the opposing second side of the body. The tabs include respective retention surfaces facing the opposing second side of the body and retention bodies extending from the respective retention surfaces toward the opposing second side of the body. Securing the duct saddle on the bracket consists of inserting the distal end of the bracket between the opposing second side of the body of the duct saddle and the retention surfaces of the retention clips such that the retention bodies extend through respective ones of the at least two holes in the bracket. The method also includes arranging a duct in the duct saddle. The method also includes securing the duct to the duct saddle by arranging a retention strap around the duct and across the second side of the body of the duct saddle.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s).

Figure 1A:
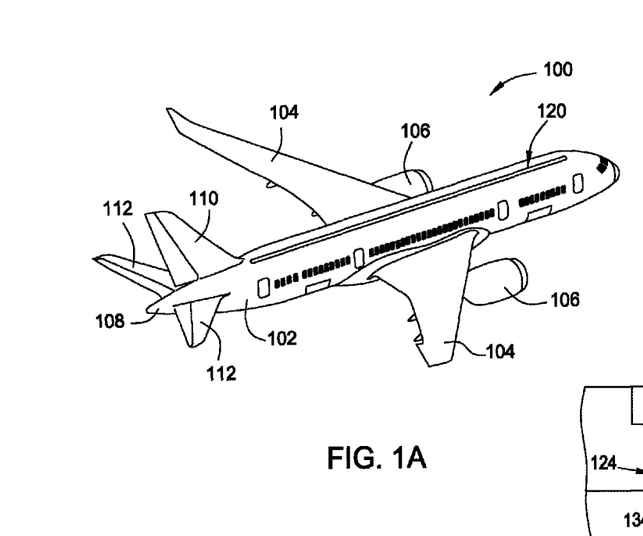
FIG. 1A is a perspective view of an aircraft, wherein a duct arranged through a length of a fuselage of the aircraft is depicted.

Various structures, such as aircraft, ships, and buildings, include ducts that distribute fluids and gases throughout the structure. FIG. 1A illustrates an aircraft 100 with a duct system 120 arranged through a fuselage 102 of the aircraft 100. For example, the duct system 120 could carry conditioned air for a cabin of the aircraft. As another example, the duct system 120 could carry hydraulic fluid or pressurized air for powering various systems or control surfaces, such as control surfaces on the wings 104 of the aircraft 100, the elevators 112, and the rudder 110 at the empennage 108 of the aircraft 100. The pressurized air could be sourced from the gas turbine engines 106 of the aircraft 100, for example. In various other instances, the duct system 120 could be conduit that carries various electrical wires, fiber optic cables, and data-carrying wires, for example.

Figure 1B:
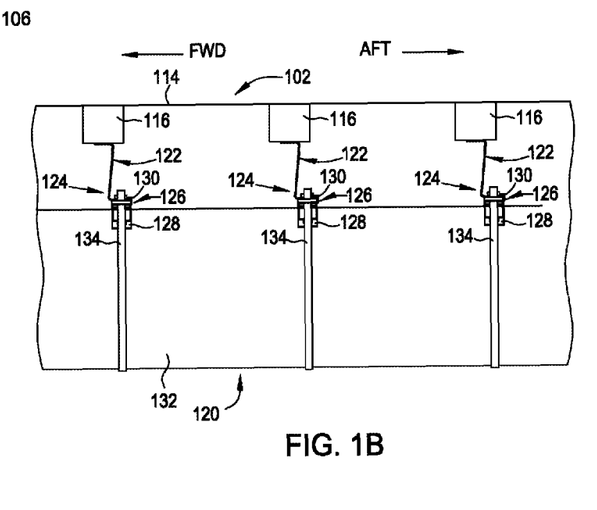
FIG. 1B is a side view of a portion of the fuselage of the aircraft of FIG. 1A that includes a portion of the duct suspended from brackets and duct saddles.

FIG. 1B is a partial cross-sectional side view of a portion of the fuselage 102 of the aircraft 100, showing the duct system 120 suspended from structural support members 116 on a skin 114 of the fuselage 102. A duct 132 of the duct system 120 is suspended from the structural support members 116 by a plurality of brackets 122 and duct saddles 126. The brackets 122 are typically formed of sheet metal that is bent or formed to include a first end that connects to the respective structural support members 116 and a second distal end 124 that engages the respective duct saddles 126. Generally, the duct 132 has a circular cross-sectional profile and the metal bracket 122 cannot be suitably formed to conform to such an exterior profile of the duct 132. The duct saddles 126 provide an interface between the substantially flat distal ends 124 of the brackets 122 and the circular exterior profile of the duct 132. The duct 132 is held to the duct saddles 126 by retention straps 134. In various aspects, the retention straps 134 are zip tie straps, such as cable ties made by Panduit Corporation. The zip tie straps can be tightened, using an installation tool such as the Plastic Cable Tie Installation Tools by Panduit Corporation (e.g., the Panduit GTS Cable Tie Tool), that enables a user to set the amount of tension that is applied to the zip ties. In various other aspects, the retention straps 134 could be hose clamp-style straps.

Typically, the duct saddles 126 are fastened to the brackets 122 with two or more fasteners (e.g., nuts and bolts) per bracket 122 and duct saddle 126. In a commercial aircraft that can include hundreds of such brackets 122 and duct saddles 126, installing duct saddles on the brackets 122 with such fasteners can be very time-consuming. In aspects described herein, the duct saddles 126 include retention clips 129 with retention bodies 146 (shown in FIGS. 2C and 2D) that engage fastener holes 202 in the brackets 122. As a result, the duct saddles 126 snap into place on the brackets 122. Furthermore, a retention strap 134 wrapped around the duct 132 and the duct saddle 126 provides a clamping force between a body 128 of the duct saddle 126 and the retention clips 129, thereby further securing the duct saddle 126 to the bracket 122 by discouraging disengagement of the retention bodies 146 from the fastener holes 202 in the brackets 122.

Figure 2A:
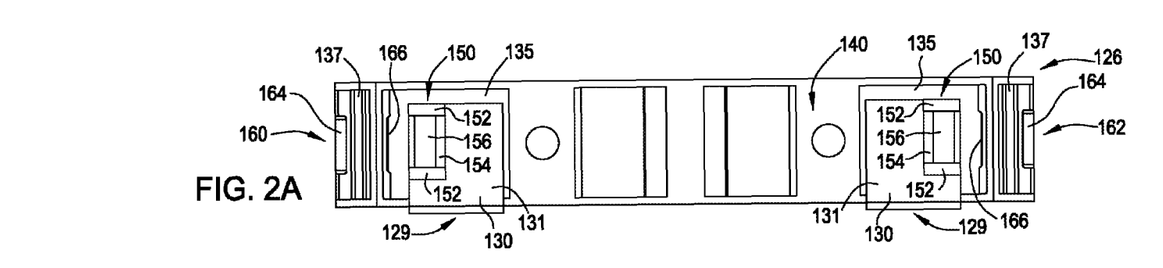
FIG. 2A is a top view of a duct saddle according to one aspect.
Figure 2B:
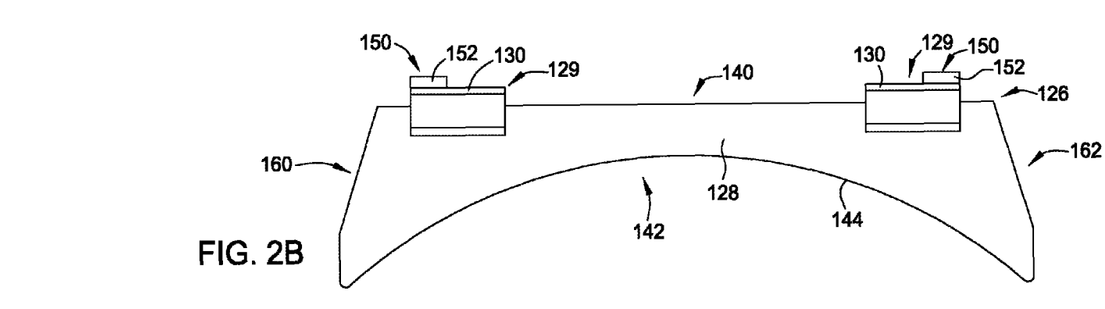
FIG. 2B is a front view of the duct saddle of FIG. 2A.
Figure 2C:
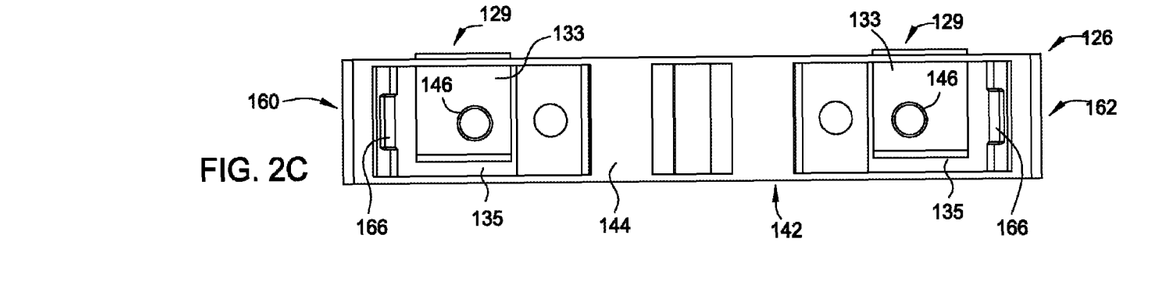
FIG. 2C is a bottom view of the duct saddle of FIG. 2A.
Figure 2D:
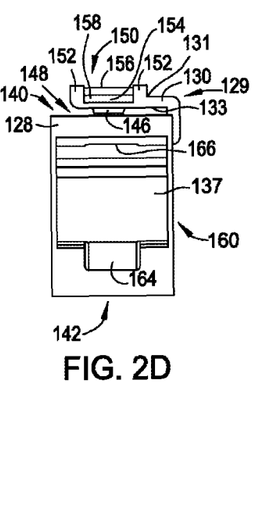
FIG. 2D is a side view of the duct saddle of FIG. 2A.

FIGS. 2A-2D illustrate various views of the duct saddle 126. FIG. 2A is a top view of the duct saddle 126, FIG. 2B is a front view of the duct saddle 126, FIG. 2C is a bottom view of the duct saddle 126, and FIG. 2D is a side view of the duct saddle 126. The body 128 of the duct saddle 126 includes a first side 142 and a second side 140. The first side 142 of the body 128 includes a duct seating surface 144. As discussed above, the duct 132 will typically have an arcuate and/or circular cross-sectional profile, and the duct seating surface 144 includes a profile to substantially conform to the cross-sectional profile of the duct 132. Thus, in the exemplary aspect depicted in FIGS. 2A-2D, the duct seating surface 144 has a semicircular profile. In various other aspects, the duct seating surface 144 could have a profile to match ducts having other cross-sectional profile shapes. For example, the duct seating surface 144 could include a radius of curvature equal to a radius of curvature of the duct 132. The second side 140 of the body 128 of the duct saddle 126 includes retention clips 129 extending therefrom. Referring primarily to FIG. 2D, the retention clips 129 include tabs 130 that extend over the second side 140 of the body 128 and are spaced apart from the body 128 of the duct saddle 126 by a gap 148. In this arrangement, a lower retention surface 133 of the tabs 130 is in a coplanar facing relationship with the second side 140, so that the retention surface 133 and the facing second side 140 form the boundaries of the gap 148. The tabs include opposing strap surfaces 131. In use, the distal end of a bracket 122 is inserted into the gap 148 between the second side 140 of the body 128 and the retention surfaces 133 of the tabs 130.

The retention surfaces 133 include retention bodies 146 extending toward the second side 140 of the body 128. The retention bodies 146 can extend into apertures 135 in the body 128. As discussed in greater detail below, the retention bodies 146 are sized to fit in holes in the brackets 122. Thus, at least a portion of the retention bodies 146 would extend through the holes in the distal end of a bracket 122 inserted into the gap 148. In various aspects, the retention bodies 146 could include a hemispherical shape. In various other aspects, the retention bodies 146 could include a ramped surface facing toward the entrance to the gap 148 and a squared surface (i.e., a surface normal to the retention surface 133) facing away from the entrance to the gap 148.

As discussed above, the duct saddle 126, the bracket 122, and the duct 132 are attached together with a retention strap 134. In various aspects, the duct saddle 126 includes one or more strap retention features thereon. For example, FIGS. 2A, 2B, and 2D illustrate strap retention channels 150 arranged on the strap surfaces 131 of the tabs 130. Each of the strap retention channels 150 includes two walls 152 that form a channel 154 on, in, or above the strap surfaces 131 of the tabs 130. For example, as shown in FIG. 2D, the channel 154 is arranged partially below a level of the strap surface 131. The walls 152 are spaced apart from one another by a dimension based on a width of the retention strap 134. For example, if the retention strap 134 is 10 mm wide, then facing surfaces of the walls 152 may be spaced apart by 10 mm to accommodate the 10 mm retention strap 134. In various aspects, the facing surfaces of the walls 152 may be spaced slightly further apart than the width of the retention strap 134 to accommodate variances in the strap with and/or to ease installation of the retention strap 134 between the walls 152. In various aspects, the strap retention channels 150 include a strap retention bridge 156 extending between the two walls and spaced apart from the strap surface 131 and/or a bottom of the channel 154 between the walls 152. The two walls 152, the strap retention bridge 156, and the strap surface 131 (or the bottom of the channel 154 formed between the walls 152) form a strap retention aperture 158. The strap retention apertures 158 prevents a retention strap 134 passing therethrough from lifting out of the retention channels 150.

The duct saddle 126 can also include grooves 164 and 166 that can further retain and/or guide a retention strap 134. For example, FIGS. 2A and 2D illustrate grooves 164 along ends 160 and 162 of the body 128. Furthermore, FIGS. 2A, 2C, and 2D illustrate grooves 166 on an interior surface of the body 128 between apertures 135 and 137 in the body 128. In use, a retention strap 134 can be passed through the strap retention apertures 158 (or retention channels 150 that do not include the strap retention bridge 156), into the apertures 135 on the second side 140 of the body 128, out of the apertures 137 on the ends of the body 128, and then down and around a duct 132. The retention strap 134 is held in place on the duct saddle 126 by the strap retention channels 150 and the grooves 164 and 166.

The duct saddles 126 are typically unitary bodies and are typically made of a plastic material, such as a nylon material, a polyvinylchloride (PVC) material, or a acrylonitrile butadiene styrene (ABS) material. The duct saddles 126 could be made by injection molding or a three-dimensional printing process. The duct saddles 126 could also be milled from a block of plastic material using a computer numerical control (CNC) mill.

Figure 3A:
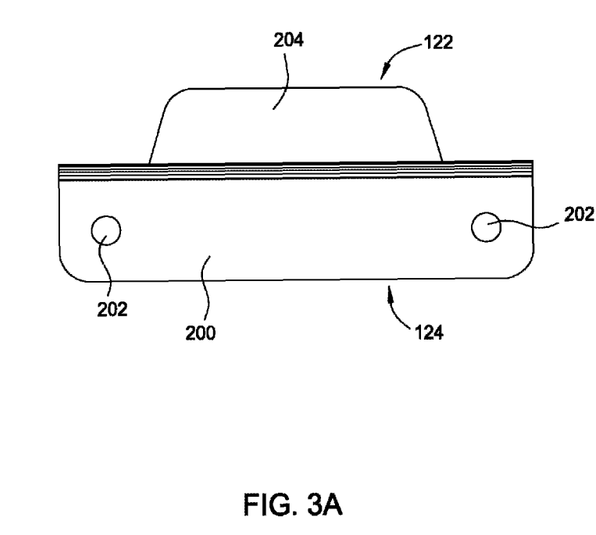
FIG. 3A is a bottom view of a bracket for engaging the duct saddle of FIG. 2A.
Figure 3B:
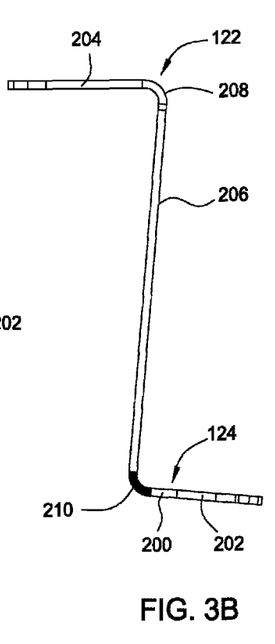
FIG. 3B is a side view of the bracket of FIG. 3A.
Figures 4A, 4B:
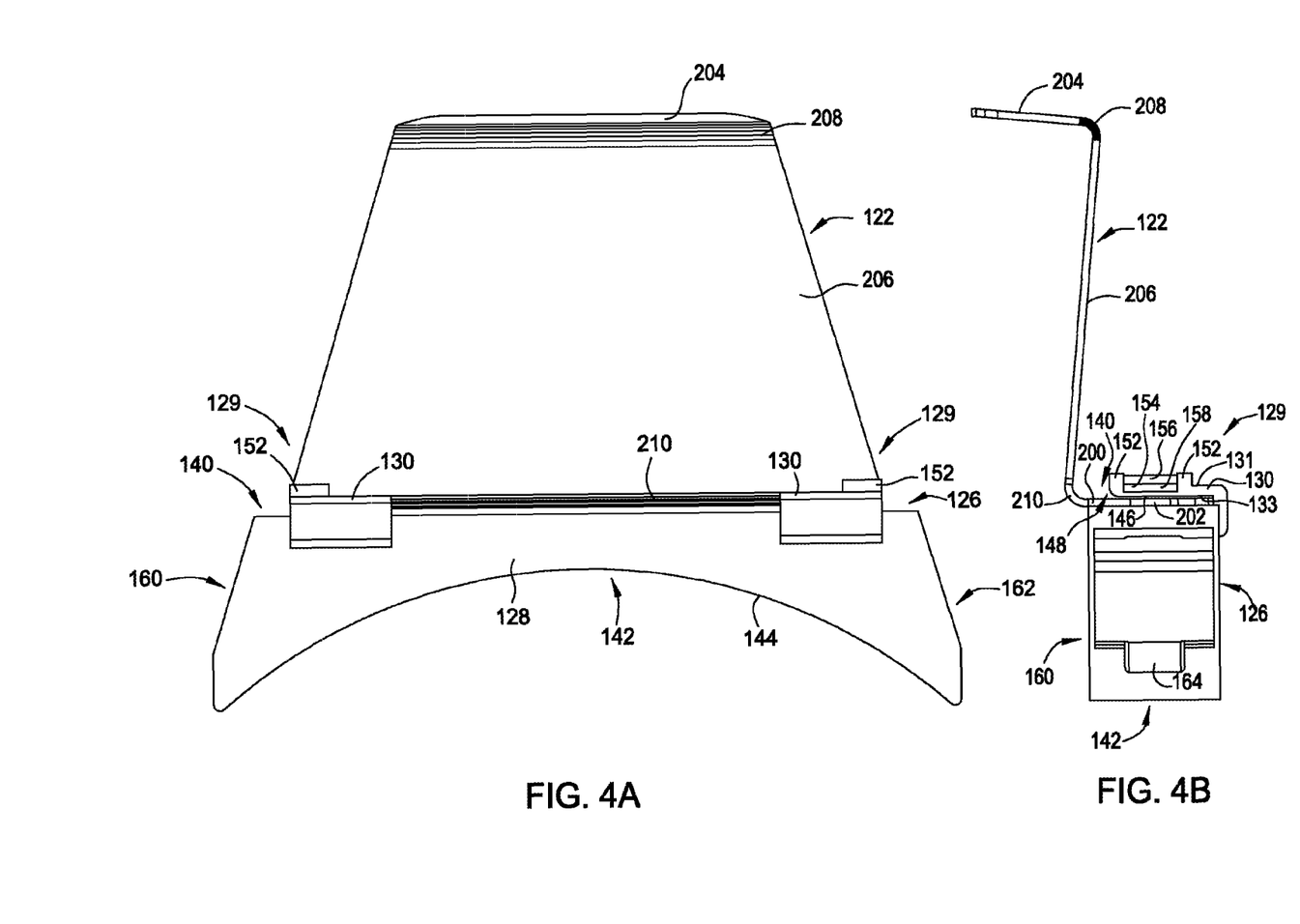
FIG. 4A is a front view of the duct saddle of FIG. 2A engaged with the bracket of FIG. 3A.
FIG. 4B is a side view of the duct saddle of FIG. 2A engaged with the bracket of FIG. 3A.

FIGS. 3A and 3B illustrate a bottom view and a side view, respectively, of a bracket 122. The bracket 122 includes a proximal end 204 that can be attached to a structural support member 116. For example, the proximal end 204 could be welded to a structural support member 116, fastened to a structural support member 116 with threaded fasteners or rivets, or attached to the structural support member 116 using an adhesive. In the illustrated aspect, the bracket 122 includes a first bend 208 extending from the proximal end 204 and a substantially vertical section 206 extending from the first bend 208. The bracket 122 also includes a second bend 210 extending from the substantially vertical section 206 and a distal end 124 extending from the second bend 210. The distal end 124 includes a substantially flat plate 200 and a plurality of fastener holes 202 therethrough. As shown, the bracket 122 includes two fastener holes 202. In various other aspects, the bracket 122 could include one fastener hole 202 or three or more fastener holes 202.

Referring again to FIG. 2D, the duct saddle 126 can be installed on a bracket 122 by inserting the distal end 124 of the bracket 122 into the gap 148 between the second side 140 of the body 128 of the duct saddle 126 and the retention surfaces 133 of the tabs 130 of the retention clips 129. The duct saddle 126 is aligned with the bracket 122 such that the retention bodies 146 extending from the retention surfaces 133 are aligned with the fastener holes 202 in the bracket 122. When the distal end 124 of the bracket 122 is inserted into the gap 148, an interference between the flat plate 200 and the retention bodies 146 causes the tabs 130 to flex away from the second side 140 of the body 128. Once the fastener holes 202 in the flat plate 200 are aligned with the retention bodies 146, the tabs 130 return to their relaxed position such that the retention bodies 146 are within the fastener holes 202. With the retention bodies 146 within the fastener holes 202, the distal end 124 of the bracket 122 is secured in the duct saddle 126. For the distal end 124 of the bracket 122 to be removed from the duct saddle 126, the tabs 130 have to be pushed away from the second side 140 of the body 128 such that the retention bodies 146 are removed from the fastener holes 202.

Figure 5A:
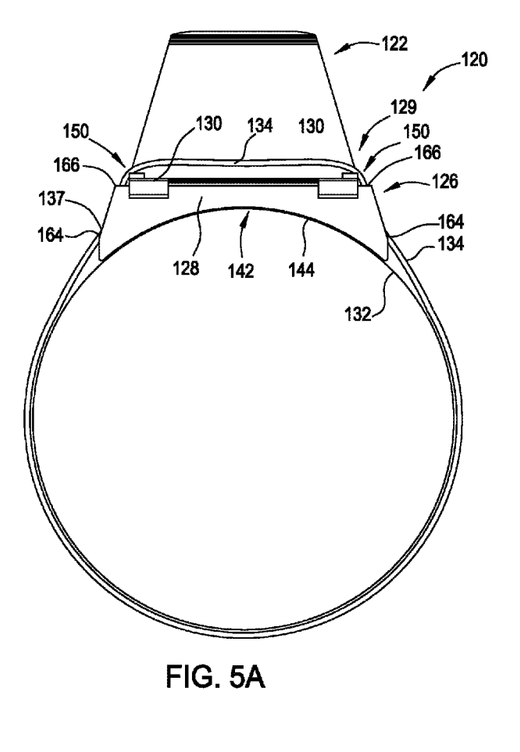
FIG. 5A is a front view of the duct saddle of FIG. 2A engaged with the bracket of FIG. 3A, wherein the duct of FIG. 1A is engaged with the duct saddle, and wherein a retention strap is arranged around the duct and the duct saddle.
Figure 5B:
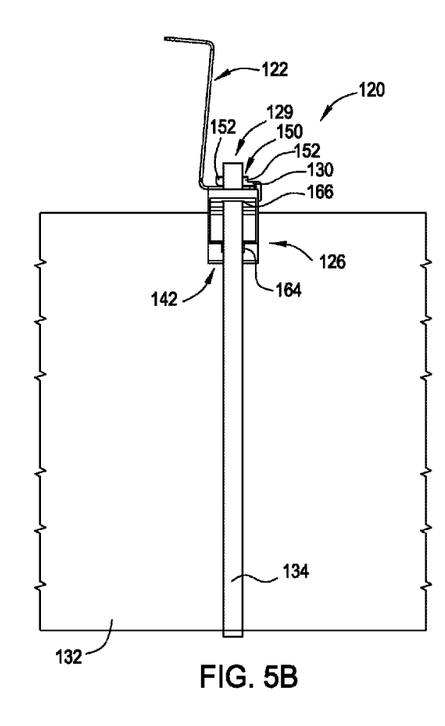
FIG. 5B is a side view of the duct saddle FIG. 2A engaged with the bracket of FIG. 3A, wherein the duct of FIG. 1A is engaged with the duct saddle, and wherein a retention strap is arranged around the duct in the duct saddle.
Figure 5C:
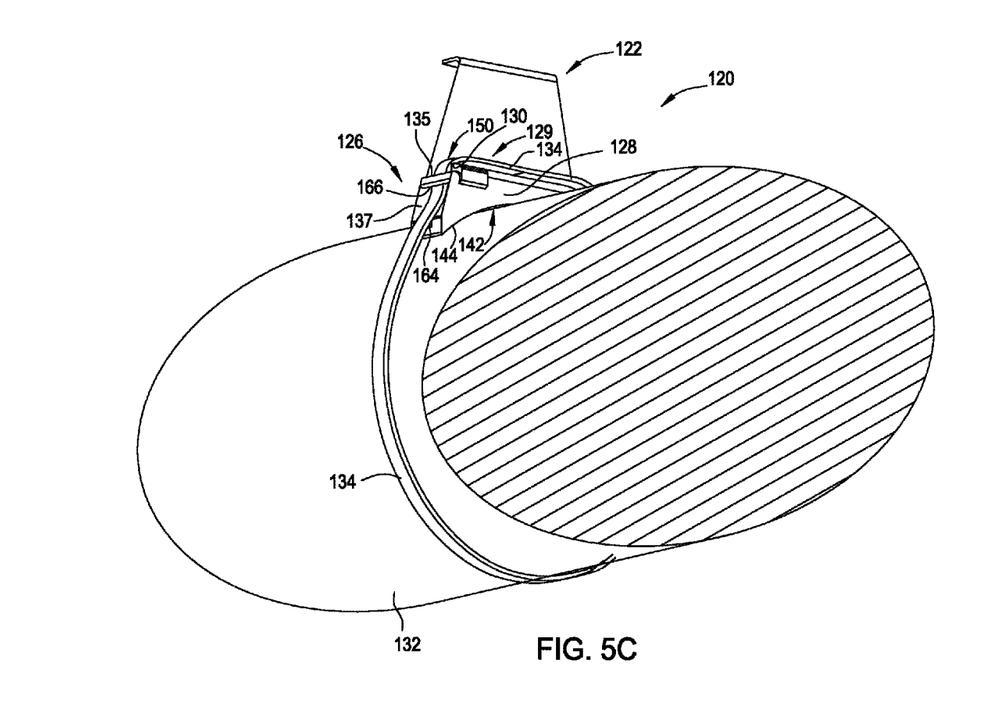
FIG. 5C is a perspective view of the duct saddle FIG. 2A engaged with the bracket of FIG. 3A, wherein the duct of FIG. 1A is engaged with the duct saddle, and wherein a retention strap is arranged around the duct in the duct saddle.

FIGS. 5A-5C illustrate the assembled duct saddle 126 and bracket 122 attached to the duct 132 with a retention strap 134. The duct 132 is seated against the duct seating surface 144 of the duct saddle 126. The retention strap 134 is arranged around the duct 132 and around the duct saddle 126. The retention strap 134 can be tightened such that the duct 132 is urged toward the duct saddle 126. Furthermore, as shown in FIGS. 5A-5C, the retention strap 134 is arranged through the strap retention channels 150 on the tabs 130 of the retention clips 129 and the grooves 164 and 166 in the body 128 of the duct saddle 126. The retention channels 150 and grooves 164 and 166 prevent the retention strap 134 from sliding off of the duct saddle 126.

The retention strap 134 is also arranged over the strap surfaces 131 of the tabs 130 (through the retention channels 150). When the retention strap 134 is tightened, the retention strap 134 exerts a clamping force on the tabs 130 that urges the tabs 130 toward the second side 140 of the body 128 of the duct saddle 126. Stated differently, the clamping force urges the tabs 130 in a direction that reduces the gap 148 between the retention surfaces 133 of the tabs 130 and the second side 140 of the body 128. This clamping force also presses the retention bodies 146 into the fastener holes 202 in the brackets 122. Thus, the clamping force constrains motion of the tabs 130 away from the second side 140 of the body 128, thereby preventing the retention bodies 146 from disengaging from the fastener holes 202 in the brackets 122.

In various aspects, in use, the duct saddles 126 are attached to brackets 122 installed in a structure, such as an aircraft, ship, or building. As discussed above, the duct saddles 126 are installed by inserting the distal ends 124 of the brackets 122 into the gaps 148 between the second sides 140 of the bodies 128 and the tabs 130 of the duct saddles 126 such that the retention bodies 146 extending from the tabs 130 are inserted into the fastener holes 202 in the distal ends 124 of the brackets 122. Thereafter, the duct 132 is arranged in the duct seating surfaces 144 of the duct saddles 126. While the duct 132 is temporarily held in place (e.g., by workers or by a lifting apparatus), retention straps are arranged through the retention channels 150 and/or grooves 164 and 166 of the duct saddles 126 and around the duct 132. Ends of the retention straps 134 are then connected and the retention straps 134 are then tightened to secure the duct 132 to the duct saddles 126.

In various aspects, the retention straps 134 can be arranged on the duct saddles 126 after the duct 132 is arranged against the duct seating surface 144 of the duct saddles 126. In various other aspects, the retention straps 134 could be arranged on the respective duct saddles 126 before the duct 132 is arranged against the duct seating surface 144 of the duct saddles 126. For example, consider aspects in which the strap retention channels 150 of the duct saddles 126 include the strap retention bridges 156 and the resulting strap retention apertures 158. The retention straps 134 could be arranged through the strap retention apertures 158 and in contact with the grooves 166 and 164. Ends of the retention straps 134 could be free or could be connected to one another in a loose configuration that provides a maximum or connected in a loose manner. After the duct saddles 126 with the arranged retention straps 134 are attached to the brackets 122, the duct 132 could be seated in the duct seating surfaces 144 of the duct saddles 126. For example, in instances in which ends of the retention straps 134 are free, the duct 132 could be lifted toward the duct seating surfaces 144 between the free ends of the retention straps 134. Thereafter, the free ends of the retention straps 134 could be connected and the retention straps 134 could be tightened to secure the duct 132 and duct saddles 126. As another example, in instances in which the ends of the retention straps 134 are loosely connected, the duct 132 could be inserted through the loosely-connected retention straps 134. Thereafter, the retention straps 134 could be tightened to secure the duct 132 and duct saddles 126.

The duct saddles 126 described herein can be used in place of a duct saddle that is attached to respective brackets 122 with fasteners. By eliminating the need for fasteners, the duct saddles 126 can be installed more quickly than duct saddles that use fasteners. Additionally, the cost and/or weight of the duct saddles (or duct saddle assemblies) may be reduced by eliminating the fasteners.

The descriptions of the various aspects described herein have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to certain aspects, other and further aspects may be devised without departing from the basic scope thereof, and the scope thereof is determined by the claims that follow.

What is claimed is:

1. A structure for suspending a duct, comprising:
   a plurality of structural support members;
   a plurality of brackets extending from the structural support members, wherein a distal end of each bracket includes a plurality of holes;
   a plurality of duct saddles arranged on the respective brackets, each duct saddle comprising:
      a body that includes a first side and an opposing second side, wherein the body includes a duct seating surface on the first side;
      a plurality of retention clips extending from the body, wherein the retention clips include respective tabs extending over the opposing second side of the body and spaced apart from the opposing second side of the body, wherein the tabs include respective retention surfaces facing the opposing second side of the body, and wherein the distal end of the respective bracket is arranged between the retention surfaces and the opposing second side of the body, and wherein the tabs of the respective duct saddles include respective strap surfaces opposite from the respective retention surfaces;
      retention bodies extending from the respective retention surfaces toward the opposing second side of the body, wherein the retention bodies extend into respective ones of the plurality of holes in the distal end of the respective bracket; and
      a plurality of strap retention channels arranged on the respective strap surfaces of the tabs;
   the duct arranged extending along the plurality of duct saddles, wherein the duct is arranged in the duct seating surfaces of the respective duct saddles; and
   a plurality of retention straps arranged around respective ones of the plurality of duct saddles and the duct, wherein the plurality of retention straps are arranged through the strap retention channels of the respective duct saddles.

2. The structure of claim 1, wherein the structure is an aircraft.

3. The structure of claim 1, wherein the structure is a building.

4. The structure of claim 1, wherein the strap retention channels each include:
   two walls extending from the respective strap surface and spaced apart from one another by a dimension based on a width of the retention straps; and
   a strap retention bridge extending between the two walls and spaced apart from the retention surface, wherein the two walls, the strap retention bridge, and the strap surface define a strap retention aperture configured to retain the retention strap between the two walls.

5. The structure of claim 1, wherein the plurality of duct saddles each further include strap grooves arranged along ends of the opposing second side of the body of the respective duct saddles, wherein the grooves are aligned with the strap retention channels, and wherein the plurality of retention straps are arranged in the retention grooves of the respective duct saddles.

6. The structure of claim 1, wherein the plurality of duct saddles further include strap grooves arranged along ends of the opposing second side of the body, and wherein the plurality of retention straps are arranged in the grooves of the respective duct saddle.

7. The structure of claim 1, wherein the duct includes a circular cross-sectional profile, and wherein the duct seating surface defines an arcuate surface that includes a profile substantially equal to a profile of an exterior surface of the duct.

* * * * *